Dec. 31, 1963   J. L. JONES   3,116,415
MECHANICAL MOTION AND SPECTROGRAPHIC DEVICE INCLUDING IT
Filed July 31, 1961   2 Sheets-Sheet 2

INVENTOR.
JAMES L. JONES
BY Hoffman Stone
ATTORNEY

United States Patent Office 3,116,415
Patented Dec. 31, 1963

3,116,415
MECHANICAL MOTION AND SPECTROGRAPHIC
DEVICE INCLUDING IT
James L. Jones, Glendale, Calif., assignor to Applied Research Laboratories, Inc., Glendale, Calif., a corporation of Delaware
Filed July 31, 1961, Ser. No. 128,033
16 Claims. (Cl. 250—51.5)

This invention relates to a novel mechanical motion, and more particularly, to a novel mechanism for constraining a movable body to a curved path, the arrangement being especially advantageous for use in certain types of spectrographic devices.

Spectrographic instruments employing diffraction gratings ruled on concave blanks generally have circularly, or very nearly circularly curved focal surfaces. It has been found desirable, particularly when working with radiation between about 10 and 1000 Angstroms wavelength, to use instruments of this type at so-called grazing incidence. Under these conditions, the radius of the focal surface is relatively large. In the usual case, a secondary slit and a radiation detector are moved along the focal surface during operation of the instrument to measure the intensities of the various successive images formed therealong by the grating. In order to insure accuracy of measurement, the secondary slit must remain accurately upon the focal surface throughout its entire scan. In grazing incidence work, it is also desirable, especially at the present stage of development of the art, to make the instrument adjustable so that the secondary slit and detector can be scanned along various different paths of different respective radii.

Some previous instruments of this type have employed a curved track for guiding the secondary slit and detector, but this arrangement is relatively expensive and inconvenient because a different track must be provided for each different path it is desired to follow. Other instruments have used a pivoted radius bar connected between the secondary slit and the center of curvature. Such an arrangement is subject to several disadvantages. It is cumbersome when used for controlling travel along paths of relatively flat curvature, especially because instruments of this type are usually operated within evacuated chambers. Also, a separate radius bar and a separate pivot point must be provided for each differently curved path it is desired to have the secondary slit and detector follow. And it is also necessary to provide further mechanical means such as a sliding link to maintain the secondary slit at its desired orientation relative to the diffraction grating.

Accordingly, one important object of the present invention is to provide a novel mechanical motion for constraining a movable body to a curved path, the motion being especially advantageous for use in grazing incidence spectrographic devices.

Other objects are: to provide a novel scanning motion for a focusing type spectrometer which is relatively simple and easily adjustable to various different curvatures; to provide a novel scanning motion of the stated type which is continuously adjustable to any desired curvature within its range, yet which is highly accurate in operation; to provide a novel spectrometer scanning motion of this type which is compact, yet capable of producing travel along paths of extremely large radius, up to and including straight line travel; to provide a novel spectrometer including a scanning motion of the stated type; and in general, to provide a novel spectrometer motion which is of relatively simple and inexpensive construction, smooth and accurate in operation, and rugged and long lasting in service.

The foregoing and other objects and advantages of the invention will become apparent in the following detailed description of a presently preferred embodiment thereof, taken in conjunction with the drawings, wherein.

Figure 1:
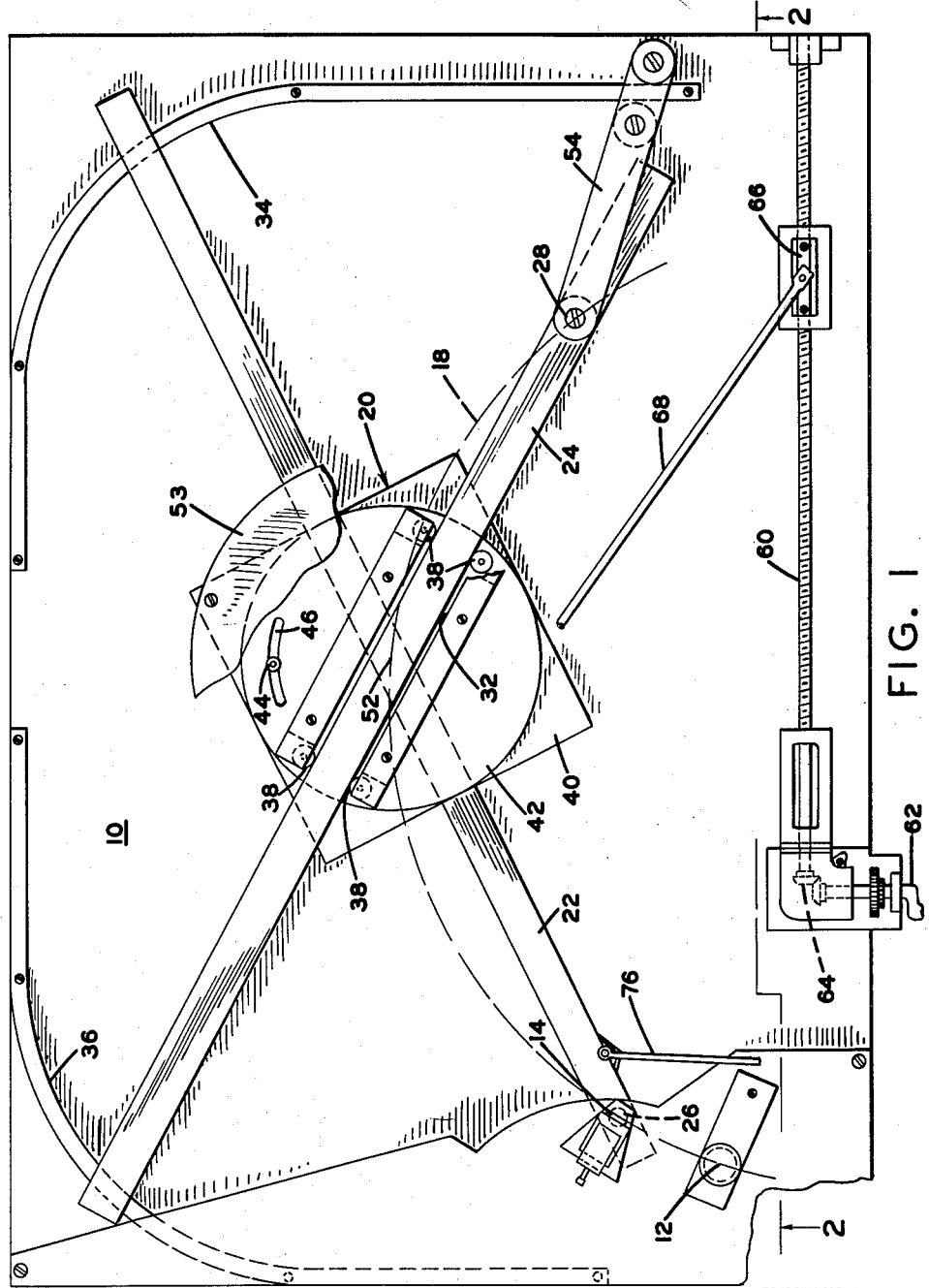
FIG. 1 is a plan view, with parts broken away, of a grazing incidence spectrometer including a scanning motion according to the preferred embodiment of the invention.
Figure 2:
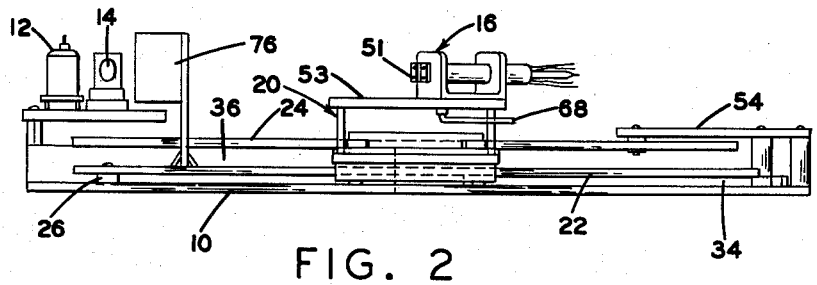
FIG. 2 is a longitudinal sectional view taken along the line 2—2 of FIG. 1.

The spectrometer motion described herein is arranged for use in a focusing type spectrometer, operated at grazing incidence, wherein an element such as a carriage supporting the secondary slit and detector assembly is moved along a curved path conforming to the focal circle of the spectrometer. The motion of the present invention includes a pair of rigid guide bars pivoted at respective fixed points on a main support, or base, and extending slidably through separate guideways in a movable carriage. The angle between the guideways in the carriage, taken with the spacing between the two pivots determines the path of travel of the carriage.

The operation of the motion is based upon the geometric theorem that all angles inscribed within a chord of a circle are equal, and more particularly upon its corollary that all equal angles the legs of which pass through two given fixed points lie on one of two circles of equal diameter. The pivots define the opposite ends of the chord, and the angle between the guide bars is fixed by the guideways so that the carriage is free to travel only along a circularly curved path, the radius of which is determined by the angle between the guideways. The guideways are angularly adjustable relative to each other so that the radius of curvature of the path may be continuously varied from infinity (straight line travel of the carriage) to a dimension equal approximately to one-half the spacing between the two pivots. The motion is relatively simple and inexpensive, and extremely compact.

Referring now to the drawings, the spectrometer shown therein is mounted upon a rigid base, or table 10, and includes a source 12 of X-rays to be diffracted, a grating 14 for diffracting the X-rays, and a secondary slit and detector assembly 16 for detecting the diffracted X-rays, all mounted at a common elevation above the table 10. The spectrometer shown is of the focusing type, and is arranged for operation at so-called grazing incidence. The diffraction grating 14 is spherically curved about a relatively large radius, and is arranged for receiving X-ray radiation from the source 12 at a relatively flat angle of about 1° to about 10°. The source 12 may be, for example, an X-ray tube having a relatively fine wire for an anode, the specimen material to be analyzed being the wire anode itself, or being applied as a surface coating on the wire anode. The source 12 thus also serves the added function of a primary slit.

The diffraction grating 14 forms focused images of the source 12 at various different points along the focal circle 18 in accordance with known principles, the different images being formed of X-rays of different respective wave lengths. The secondary slit and detector assembly 16 is moved along the focal circle 18 to measure the intensities of the various different images formed therealong by the diffraction grating 14.

For this purpose, the secondary slit and detector assembly 16 is mounted upon a carriage 20, which is freely movable on the table 10, and guided along the focal circle 18 by two guide bars 22 and 24, respectively. The guide bars 22 and 24 are supported on spaced pivots 26 and 28, respectively for rotation parallel to the table 10, and extend through respective guideways 30 and 32 on the carriage 20. The ends of the guide bars 22 and 24 remote from the pivots 26 and 28 rest upon upright flanges 34 and 36, respectively, so that the bars 22 and 24 do not bear on the carriage 20 in a direction normal to the table 10. The guideways 30 and 32 are preferably provided with rollers 38, as shown, which bear against the side edges of the guide bars 22 and 24 to permit free lengthwise translation of the guide bars 22 and 24 in the guideways 30 and 32 with a minimum of friction, thereby facilitating operation under high vacuum conditions. The rollers 38 constitute the sole contact between the guide bars 22 and 24 and the guideways 30 and 32.

Figure 4:
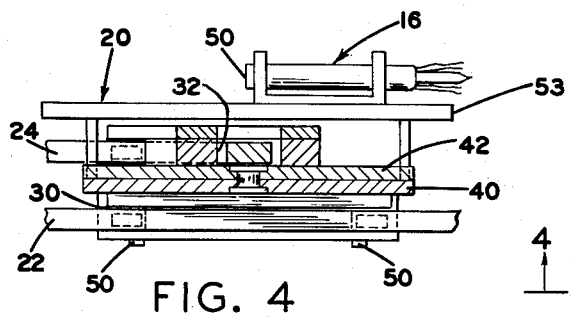
FIG. 4 is a sectional view taken along the line 4—4 of FIG. 3.
Figure 3:
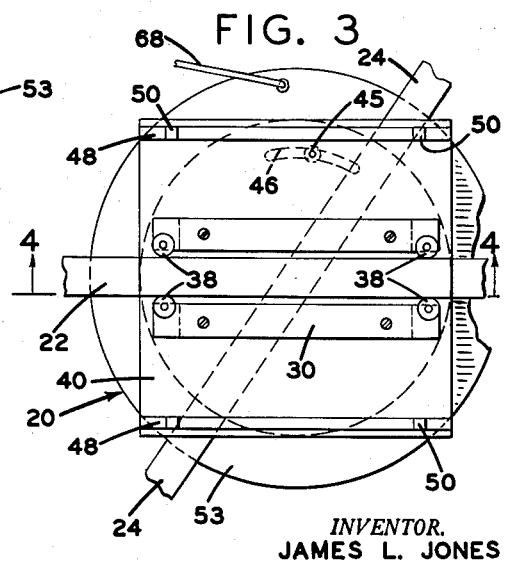
FIG. 3 is a bottom view of the scanning carriage of the spectrometer.

As best seen in FIGS. 3 and 4, the first guideway 30 is mounted on the bottom of the carriage base 40, and the first guide bar 22 passes beneath the base 40. The second guideway 32 is fixed upon a turntable 42, which is centrally pivoted upon the base 40, and which may be angularly fixed with respect to the base by means of a lock screw 44. The lock screw 44 is threadedly engaged in an aperture 45 in the carriage base 40, and extends through an arcuate slot 46 in the turntable 42, with its head, or a washer extending over the edge of the slot. When the lock screw 44 is tightened, it binds the turntable 42 against the base 40 to lock them against relative rotation.

It is also desirable to maintain the secondary slit 51 in a plane always normal to the line of sight between it and the center of the diffraction grating 14. For this purpose, the secondary slit and detector assembly 16 is mounted upon a platform 53, which is fixed to and carried by the base 40 of the carriage. The base 40 of the carriage mounts the first guideway 30, which receives and remains in alignment with the first guide bar 22, and is therefore always in alignment with the first pivot 26 and the diffraction grating 14. By fixing the secondary slit 51 relative to the base 40 and the first guideway 30, it remains always facing the diffraction grating 14 throughout the entire travel of the carriage 20.

The base 40 is supported on a pair of depending flanges 48, which are fixed to the base and extend along two opposite edges thereof. Each of the flanges 48 is formed with a pair of bosses, or shoes 50, which alone contact the table 10 to provide relatively small area, low friction contact with the table 10 for smooth travel of the carriage 20 therealong. A shield 76, which may be arranged as desired, is provided for shielding the secondary slit and detector assembly 16 from direct radiation from the source 12. As shown, the shield is adjustably mounted on the first guide bar 22 adjacent to the source 12.

The two pivots 26 and 28 for the guide bars 22 and 24 must be on the focal circle 18, the radius of which depends upon the radius of curvature of the diffraction grating 14. The secondary slit 51 is mounted in alignment with the central point of intersection 52 of the two guide bars 22 and 24, and it also must be and remain on the focal circle 18. The first pivot 26 is fixed in alignment with the center of the diffraction grating 14. The adjustment to bring the second pivot 28 and the secondary slit 51 onto the focal circle 18 is achieved by rotating the guideways 30 and 32 relative to each other. Once this adjustment is made for a particular diffraction grating 14, the guideways 30 and 32 are locked in position by tightening the lock screw 44, and thereafter the carriage 20 is free to move only along the focal circle 18.

The second pivot 28 is supported upon a cantilever arm 54, which extends over the second guide bar 24. This arrangement permits the carriage to move partly beyond the pivot 28, thereby permitting maximum travel of the carriage with a compact construction.

Any desired arrangement may be provided for driving the carriage 20 along the table 10. As shown, a drive screw 60 is mounted along one side of the table 10, being journaled thereon for rotation by a hand crank 62 through a pair of bevel gears 64. The screw engages the follower nut 66, which is connected to the carriage 20 by a link 68. Rotation of the drive screw 60 drives the follower nut 66 along the screw, and the nut, in turn, pulls or pushes the carriage 20 across the table 10 along the path defined by the pivots 26 and 28 and the angle between the guideways 30 and 32.

Figure 5:
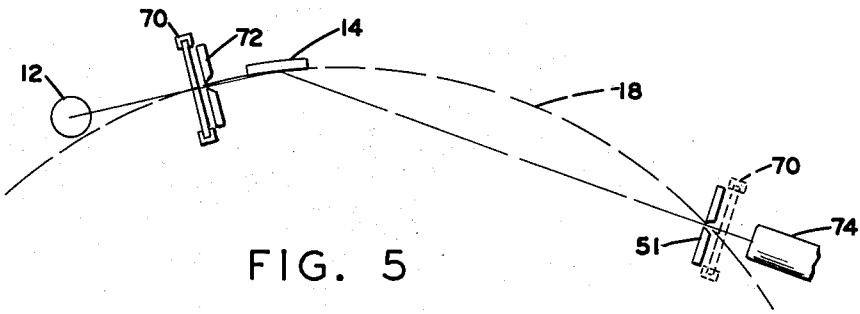
FIG. 5 is a schematic plan view of the spectrometer particularly showing alternative specimen positioning arrangements.

The practice of the invention is not limited to the precise form of construction illustrated and described herein, nor is it limited to the particular type of auxiliary equipment described. For example, as shown in FIG. 5, instead of being arranged for measuring X-ray radiation produced in response to electron bombardment, the spectrometer may be arranged for absorption spectroscopy, in which case a specimen holder 70 would be positioned between the source 12 of radiation and the primary slit 72, or alternatively, between the secondary slit 51 and the detector 74. In these cases, the primary slit 72 would be placed on the focal circle 18, and the radiation source 12 would be placed in direct alignment with the center of the diffraction grating 14 and the primary slit 72. For X-ray stimulated fluorescent spectroscopy, the specimen holder 70 would be placed in the usual position of the X-ray source 12, and the X-ray source would be moved off the side and arranged to illuminate the specimen only. Also various different radiation sources, and different diffraction elements may be substituted for the source 12 and the diffraction grating 14 shown herein, all as desired.

The motion of the invention is readily adjustable from a position in which the two guide bars 22 and 24 are parallel to each other, in which case the carriage 20 travels a straight line between the two pivots 26 and 28 (a circular path of infinite radius) to a position where the two guideways 30 and 32 make a relatively small, yet still obtuse angle between them. In one actual embodiment of the invention in which the two pivots 26 and 28 were spaced apart a distance of twenty-two and three-sixteenths inches, on centers, the path of travel of the carriage could be varied continuously from straight line travel to a curve of one-half meter radius, while still providing smooth and accurate operation.

What is claimed is:

1. A mechanical motion comprising a body, means supporting said body for movement in a selected plane, first and second rigid guide bars pivoted at respective spaced points for rotation parallel to said plane, and means carried by said body for receiving said guide bars and maintaining them at a predetermined angle relative to each other, said guide bars being freely translatable in said receiving means, whereby said body is constrained for travel along a circularly curved path having a radius of curvature greater than one-half the distance between said spaced points.

2. A mechanism for constraining a movable body to a circularly curved path comprising a pair of rigid guide bars pivoted at spaced apart points for rotation parallel to each other, means mounted on the movable body for slidably receiving said guide bars and maintaining them at a predetermined obtuse angle relative to each other, whereby the body is constrained for travel along a circularly curved path having a radius of curvature greater than one-half the distance between said spaced points.

3. A mechanical motion comprising a body, means supporting said body for movement in a selected plane, first and second rigid guide bars pivoted at respective spaced points for rotation parallel to said plane, and means carried by said body for receiving said guide bars and maintaining them at an adjustably fixed obtuse angle relative to each other, said guide bars being freely translatable lengthwise in said receiving means, whereby said body is constrained for travel along a curved path having a radius of curvature greater than one-half the distance between said spaced points.

4. A mechanical motion comprising a body, means supporting said body for movement in a selected plane, first and second rigid guide bars pivoted at respective spaced points for rotation parallel to said plane, means carried by said body for receiving said guide bars and maintaining them at a predetermined obtuse angle relative to each other, said guide bars being freely translatable in said receiving means, and means for supporting said guide bars independently of said body, thereby to minimize friction in said motion, whereby said body is smoothly constrained for travel along a curved path having a radius of curvature greater than one-half the distance between said spaced points.

5. A mechanical motion comprising a body, means supporting said body for movement in a selected plane, first and second rigid guide bars pivoted at respective spaced points for rotation parallel to said plane, means carried by said body for receiving said guide bars and maintaining them at a predetermined obtuse angle relative to each other, said guide bars being freely translatable in said receiving means, and means for supporting said guide bars independently of said body thereby to minimize friction in said motion, said receiving means including pivoted rollers which constitute the sole contact between said guide bars and said receiving means, whereby said body is smoothly constrained for travel along a curved path having a radius of curvature greater than one-half the distance between said spaced points.

6. A mechanical motion comprising a body, means supporting said body for movement in a selected plane, first and second rigid guide bars pivoted at respective spaced points for rotation parallel to said plane, means carried by said body for receiving said guide bars and maintaining them at a predetermined obtuse angle relative to each other, said guide bars being freely translatable in said receiving means whereby said guide bars and said receiving means cooperate to constrain said body for travel along a curved path having a radius of curvature greater than one-half the distance between said spaced points, and drive means for driving said body along the path to which it is constrained.

7. A mechanical motion comprising a body, means supporting said body for movement in a selected plane, first and second rigid guide bars pivoted at respective spaced points for rotation parallel to said plane, means carried by said body for receiving said guide bars and maintaining them at a predetermined obtuse angle relative to each other, said guide bars being freely translatable in said receiving means whereby said guide bars and said receiving means cooperate to constrain said body for travel along a curved path having a radius of curvature greater than one-half the distance between said spaced points, and drive means separate from said guide bars for driving said body along the path to which it is constrained.

8. In a spectographic instrument of the type having a generally circularly curved focal surface and means for producing relative circular motion for scanning the focal surface, the improvement whereby the circular motion means comprises a body supported for free movement in a selected plane, a pair of rigid guide bars pivoted at respective spaced apart points for rotation parallel to said plane, and means on said body for receiving said bars and maintaining them at a predetermined angle relative to each other, said bars being freely translatable lengthwise in said receiving means, whereby said bars constrain said body for travel along an arc having a radius of curvature determined by said predetermined angle and the spacing between said spaced points.

9. A spectrometer of the type having a concave diffracting element and a circularly curved focal surface, said spectrometer comprising means defining a slit movable along the focal surface, a carriage for mounting said slit means, means supporting said carriage for movement in a selected plane normal to the focal surface, and means for constraining said carriage for travel along the focal surface, said constraining means including a first guide bar, means pivoting said first guide bar for rotation parallel to said selected plane about an axis aligned with the center of the diffracting element, a second guide bar, means pivoting said second guide bar for rotation parallel to said selected plane about an axis lying in the focal surface and spaced from said aligned axis, and first and second receiving means carried by said carriage for respectively receiving said guide bars and maintaining them at a predetermined angle relative to each other, said guide bars being freely translatable lengthwise in said receiving means, whereby said guide bars and said receiving means cooperate to constrain said carriage for travel along a circular path coincident with the focal surface.

10. A spectrometer of the type having a concave diffracting element and a circularly curved focal surface, said spectrometer comprising means defining a slit movable along the focal surface, a carriage for mounting said slit means, means supporting said carriage for free movement in a selected plane normal to the focal surface, and means for constraining said carriage for travel along the focal surface, said constraining means including a first guide bar, means pivoting said first guide bar for rotation parallel to said selected plane about an axis aligned with the center of the diffracting element, a second guide bar, means pivoting said second guide bar for rotation parallel to said selected plane about an axis lying on the focal surface and spaced from said aligned axis, and first and second receiving means carried by said carriage for respectively receiving said guide bars and maintaining them at an adjustably fixed angle relative to each other, said guide bars being freely translatable lengthwise in said receiving means whereby said guide bars and said receiving means cooperate to constrain said carriage for travel along a circular path coincident with the focal surface.

11. A spectrometer of the type having a concave diffracting element and a circularly curved focal surface, said spectrometer comprising means defining a slit movable along the focal surface, a carriage for mounting said slit means, means supporting said carriage for movement in a selected plane normal to the focal surface, and means for constraining said carriage for travel along the focal surface, said constraining means including a first guide bar, means pivoting said first guide bar for rotation parallel to said selected plane about an axis aligned with the center of the diffracting element, a second guide bar, means pivoting said second guide bar for rotation parallel to said selected plane about an axis lying on the focal surface and spaced from said aligned axis, first and second receiving means carried by said carriage for respectively receiving said guide bars and maintaining them at a predetermined angle relative to each other, said guide bars being freely translatable lengthwise in said receiving means whereby said guide bars and said receiving means cooperate to constrain said carriage for travel along a circular path coincident with the focal surface, and means angularly fixing said slit means relative to said first receiving means thereby to maintain a constant angular orientation of said slit relative to the diffracting element throughout the entire travel of said slit means.

12. A spectrometer of the type having a concave diffracting element and a circularly curved focal surface, said spectrometer comprising means defining a slit movable along the focal surface, a carriage for mounting said slit means, means supporting said carriage for free movement in a selected plane normal to the focal surface, and means for constraining said carriage for travel along the focal surface, said constraining means including a first guide bar, means pivoting said first guide bar for rotation parallel to said selected plane about an axis aligned with the center of the diffracting element, a second guide bar, means pivoting said second guide bar for rotation parallel to said selected plane about an axis lying on the focal surface and spaced from said aligned axis, first and second receiving means carried by said carriage for respectively receiving said guide bars and maintaining them at a predetermined angle relative to each other, and means independent of said carriage for supporting said guide bars parallel to said selected plane, said guide bars being freely translatable lengthwise in said receiving means whereby said guide bars and said receiving means cooperate to constrain said carriage for smooth travel along a circular path coincident with the focal surface.

13. A spectrometer of the type having a concave diffracting element and a circularly curved focal surface, said spectrometer comprising means defining a slit movable along the focal surface, a carriage for mounting said slit means, means supporting said carriage for free movement in a selected plane normal to the focal surface, and means for constraining said carriage for travel along the focal surface, said constraining means including a first guide bar, means pivoting said first guide bar for rotation parallel to said selected plane about an axis aligned with the center of the diffracting element, a second guide bar, means pivoting said second guide bar for rotation parallel to said selected plane about an axis lying on the focal surface and spaced from said aligned axis, first and second receiving means carried by said carriage for respectively receiving said guide bars and maintaining them at a predetermined angle relative to each other, and means independent of said carriage for supporting said guide bars parallel to said selected plane, said guide bars being freely translatable lengthwise in said receiving means, said receiving means including anti-friction members for contacting said guide bars, said anti-friction members constituting the sole contact between said guide bars and said receiving means, whereby said guide bars and said receiving means cooperate to constrain said carriage for smooth travel along a circular path coincident with the focal surface.

14. A spectrometer of the type having a concave diffracting element and a circularly curved focal surface, said spectrometer comprising means defining a slit movable along the focal surface, a carriage for mounting said slit means, means supporting said carriage for free movement in a selected plane normal to the focal surface, and means for constraining said carriage for travel along the focal surface, said constraining means including a first guide bar, means pivoting said first guide bar for rotation parallel to said selected plane about an axis aligned with the center of the diffracting element, a second guide bar, means pivoting said second guide bar for rotation parallel to said selected plane about an axis lying on the focal surface and spaced from said aligned axis, first and second receiving means carried by said carriage for respectively receiving said guide bars and maintaining them at a predetermined angle relative to each other, and means independent of said carriage for supporting said guide bars parallel to said selected plane, said guide bars being freely translatable lengthwise in said receiving means, said receiving means including rollers for contacting said guide bars, said rollers constituting the sole contact between said guide bars and said receiving means, whereby said guide bars and said receiving means cooperate to constrain said carriage for smooth travel along a circular path coincident with the focal surface.

15. A spectrometer of the type having a concave diffracting element and a circularly curved focal surface, said spectrometer comprising means comprising a slit movable along the focal circle, a carriage for mounting said slit means, means supporting said carriage for free movement in a selected plane normal to the focal surface, and means for constraining said carriage for travel along the focal surface, said constraining means including a first guide bar, means pivoting said first guide bar for rotation parallel to said selected plane about an axis aligned with the center of the diffracting element, a second guide bar, means pivoting said second guide bar for rotation parallel to said selected plane about an axis lying on the focal surface and spaced from said aligned axis, and first and second receiving means carried by said carriage for respectively receiving said guide bars and maintaining them at a predetermined angle relative to each other, said guide bars being freely translatable lengthwise in said receiving means whereby said guide bars and said receiving means cooperate to constrain said carriage for travel along a circular path coincident with the focal surface, and drive means for driving said carriage along the path to which it is constrained by said guide bars and said receiving means.

16. A spectrometer of the type having a concave diffracting element and a circularly curved focal surface, said spectrometer comprising means defining a slit movable along the focal circle, a carriage for mounting said slit means, means supporting said carriage for free movement in a selected plane normal to the focal surface, and means for constraining said carriage for travel along the focal surface, said constraining means including a first guide bar, means pivoting said first guide bar for rotation parallel to said selected plane about an axis aligned with the center of the diffracting element, a second guide bar, means pivoting said second guide bar for rotation parallel to said selected plane about an axis lying on the focal surface and spaced from said aligned axis, and first and second receiving means carried by said carriage for respectively receiving said guide bars and maintaining them at a predetermined angle relative to each other, said guide bars being freely translatable lengthwise in said receiving means whereby said guide bars and said receiving means cooperate to constrain said carriage for travel along a circular path coincident with the focal surface, and drive means independent of said guide bars for driving said carriage along the path to which it is constrained by said guide bars and said receiving means.

References Cited in the file of this patent

UNITED STATES PATENTS

| | | |
|---|---|---|
| 2,648,011 | Good | Aug. 4, 1953 |
| 2,898,469 | Rose | Aug. 4, 1959 |
| 2,958,776 | Jones | Nov. 1, 1960 |